United States Patent
Zheng et al.

(10) Patent No.: US 10,951,352 B2
(45) Date of Patent: *Mar. 16, 2021

(54) COMMUNICATIONS METHOD AND APPARATUS

(71) Applicant: Huawei Technologies Co., Ltd., Shenzhen (CN)

(72) Inventors: Chen Zheng, Shanghai (CN); Liang Ma, Shanghai (CN); Yuejun Wei, Shanghai (CN); Xin Zeng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/562,389

(22) Filed: Sep. 5, 2019

(65) Prior Publication Data
US 2019/0393978 A1     Dec. 26, 2019

Related U.S. Application Data

(63) Continuation of application No. 16/196,824, filed on Nov. 20, 2018, now Pat. No. 10,419,158, which is a (Continued)

(30) Foreign Application Priority Data

May 5, 2017     (CN) .......................... 201710313891.X

(51) Int. Cl.
*H04L 1/00*     (2006.01)
*H04L 1/18*     (2006.01)

(52) U.S. Cl.
CPC .............. *H04L 1/0013* (2013.01); *H04L 1/18* (2013.01); *H04L 1/1812* (2013.01);
(Continued)

(58) Field of Classification Search
CPC ....... H04L 1/0013; H04L 1/1845; H04L 1/18; H04L 1/1812; H04L 1/0071;
(Continued)

(56) References Cited

U.S. PATENT DOCUMENTS

2011/0145670 A1   6/2011  Fan et al.
2016/0028513 A1*  1/2016  Werner ................. H04L 5/0007
                                                                370/330
(Continued)

FOREIGN PATENT DOCUMENTS

CN          101188428 A        5/2008
CN          101388743 A        3/2009
(Continued)

OTHER PUBLICATIONS

U.S. Appl. No. 16/196,824, filed Nov. 20, 2018.
(Continued)

*Primary Examiner* — Dac V Ha
(74) *Attorney, Agent, or Firm* — Leydig, Voit & Mayer, Ltd.

(57) ABSTRACT

Embodiments of this application provide a communications method and apparatus. The method includes: obtaining an input sequence for rate matching, wherein the input sequence is a retransmission sequence corresponding to a transport block, the input sequence comprises M code block groups, a value of M is less than a quantity of code block groups obtained after the transport block is segmented, and the M code block groups comprise $C_t$ code blocks; and performing rate matching on the $C_t$ code blocks, wherein a length of a rate matching output sequence of of each of the $C_t$ code blocks satisfies the following conditions: when $j \leq C_t - \gamma - 1$, $E = N_L \cdot Q_m \cdot \lfloor G'/C_t \rfloor$; when $j > C_t - \gamma - 1$, $E = N_L \cdot Q_m \cdot \lceil G'/C_t \rceil$. The method may be applicable to a system in which transmission is performed based on a code block group, and
(Continued)

resources are fully used as many as possible, thereby improving performance.

21 Claims, 4 Drawing Sheets

Related U.S. Application Data continuation of application No. PCT/CN2018/081506, filed on Apr. 2, 2018.

(52) U.S. Cl.
CPC .......... *H04L 1/1845* (2013.01); *H04L 1/0025* (2013.01); *H04L 1/0067* (2013.01); *H04L 1/0071* (2013.01)

(58) Field of Classification Search
CPC ... H04L 1/0025; H04L 1/0067; H04L 1/1835; H04L 1/0041; H04L 1/1816; H04L 1/0072; H04L 1/0061
See application file for complete search history.

(56) References Cited

U.S. PATENT DOCUMENTS

| | | | |
|---|---|---|---|
| 2016/0056926 A1 | 2/2016 | Li et al. | |
| 2017/0294990 A1 | 10/2017 | Xu et al. | |
| 2017/0373809 A1 | 12/2017 | Kim et al. | |
| 2018/0083736 A1* | 3/2018 | Manolakos | H03M 13/2707 |
| 2018/0278370 A1 | 9/2018 | Jeong et al. | |
| 2018/0287744 A1* | 10/2018 | Sundararajan | H04L 1/1822 |
| 2019/0132087 A1* | 5/2019 | Wu | H04L 1/1671 |
| 2019/0356430 A1* | 11/2019 | Cheng | H04L 1/1614 |

FOREIGN PATENT DOCUMENTS

| | | |
|---|---|---|
| CN | 103906257 A | 7/2014 |
| CN | 105515719 A | 4/2016 |
| WO | 2006068371 A1 | 6/2006 |

OTHER PUBLICATIONS

Gallager, "Low-Density Parity-Check Codes," pp. 1-8, IRE Transactions on Information Theory (1962).

"IEEE Standard for Air Interface for Broadband Wireless Access Systems," IEEE Computer Society and the IEEE Microwave Theory and Techniques Society, pp. 1-2544, IEEE Std 802.16™—2012, Institute of Electrical and Electronics Engineers, New York, New York (Aug. 17, 2012).

"Short Block Length LDPC Codes for TC Synchronization and Channel Coding," Experimental Specification CCSDS 231.1-O-1, Research and Development for Space Data System Standards, Orange Book, pp. 1-39, The Consultative Committee for Space Data Systems (Apr. 2015).

"Digital Video Broadcasting (DVB); Frame structure channel coding and modulation for a second generation digital transmission system for cable systems (DVB-C2)," pp. 1-112, ETSI EN 302 769 V1.3.1 (Oct. 2015).

"Digital Video Broadcasting (DVB); Frame structure channel coding and modulation for a second generation digital terrestrial television broadcasting system (DVB-T2)," pp. 1-188, ETSI EN 302 755 V1.4.1 (Jul. 2015).

"Soft buffer management for Rei-13 CA," 3GPP TSG RAN WG1 Meeting #83, Anaheim, USA, R1-157189, pp. 1-4, 3rd Generation Partnership Project, Valbonne, France (Nov. 15-22, 2015).

"Introduction of FeMTC in 36.212," 3GPP TSG HAN WG1 Meeting #88, Athens, Greece, R1-1701784, pp. 1-9, 3rd Generation Partnership Project, Valbonne, France (Feb. 13-17, 2017).

"Overview of CBG-based retransmission in NR," 3GPP TSG RAN WG1 Meeting #88bis, Spokane, USA, R1-1705401, pp. 1-4, 3rd Generation Partnership Project, Valbonne, France (Apr. 3-7, 2017).

"Views on HARQ enhancements for NR," 3GPP TSG RAN WG1 Meeting #88, Athens, Greece, R1-1702815, total 6 pages, 3rd Generation Partnership Project, Valbonne, France (Feb. 13-17, 2017).

"On rate matching for LDPC codes," 3GPP TSG RAN WG1 Meeting #88bis, Spokane, USA, R1-1704253, total 4 pages, 3rd Generation Partnership Project, Valbonne, France (Apr. 3-7, 2017).

* cited by examiner

COMMUNICATIONS METHOD AND APPARATUS

CROSS-REFERENCE TO RELATED APPLICATIONS

This application is a continuation of U.S. patent application Ser. No. 16/196,824, filed on Nov. 20, 2018, which is a continuation of International Application No. PCT/CN2018/081506, filed on Apr. 2, 2018, which claims priority to Chinese Patent Application No. 201710313891.X, filed on May 5, 2017. The disclosures of the aforementioned applications are hereby incorporated by reference in their entireties.

TECHNICAL FIELD

This application relates to communication technologies, and in particular, to a communications method and apparatus.

BACKGROUND

With development of technologies, low-density parity-check (LDPC) bits are introduced to communications systems to encode information, and a check matrix of the low-density parity-check code is a sparse matrix.

In a system in which encoding may be performed by using the LDPC, for example, a new radio (NR) system, transmission which is based on code block group needs to be implemented. However, an existing rate matching algorithm is based on a system in which encoding is performed by using Turbo code. In the system in which encoding is performed by using the Turbo code, both initial transmission and retransmission are for all code blocks in a transport block.

SUMMARY

Embodiments of this application provide a communications method and apparatus, to provide a solution applicable to a system in which transmission is performed based on a code block group.

According to a first aspect, this application provides a rate matching method. The rate matching method includes: obtaining an input sequence, where the input sequence is an initial transmission sequence or a retransmission sequence corresponding to a transport block, the input sequence includes M code block groups, and a value of M is less than or equal to a quantity of code block groups obtained after the transport block is segmented; and obtaining a soft buffer size $B_j$ corresponding to a $j^{th}$ code block in the M code block groups, where a value of $B_j$ is determined based on a length $K_w$ of the $j^{th}$ code block after being encoded, a quantity $C_t$ of code blocks included in the M code block groups, and a soft buffer size $N_{IR}$ of the transport block; determining, based on $B_j$, a bit set used for transmission; and obtaining an output sequence based on the bit set.

According to a second aspect, an embodiment of this application further provides a communications apparatus. The communications apparatus may be configured to implement the communications method according to the first aspect. The communications apparatus may be a terminal, a base station, a baseband chip, a data signal processing chip, or a general-purpose chip.

In the foregoing method and apparatus, a soft buffer size of each code block during rate matching is determined based on a quantity of actually sent code block groups, so that resources can be fully used as many as possible, thereby improving performance.

In a possible implementation, when $K_w$ is limited by $N_{max}$ and $N_{IR}$, the value of $B_j$ satisfies $B_j=K_w$. In this implementation, limitations of $N_{max}$ and a soft buffer size of a transport block on a length of an encoded code block are completed in an encoding phase, so that redundant bits during rate matching are reduced, and complexity is relatively low.

In a possible implementation, when $K_w$ is limited by $N_{max}$, the value of $B_j$ satisfies $B_j=\min(\lfloor N_{IR}/C_t \rfloor, K_w)$. In this implementation, an algorithm used in the encoding phase is relatively simple and is relatively easy to implement.

In another possible implementation, the value of $B_j$ satisfies $B_j=\min(\lfloor N_{IR}/C_t \rfloor, K_w, N_{max})$, where $N_{max}$ represents a maximum available length of an encoded code block. In this implementation, an encoder merely needs to complete a relatively simple encoding operation, and other limitations are completed during rate matching. Functions implemented in different phases are more clearly defined.

According to a third aspect, this application further provides a communications method. The method is applicable to a retransmission scenario and includes: obtaining an input sequence for rate matching, where the input sequence is a retransmission sequence corresponding to a transport block, the retransmission sequence includes M code block groups, a value of M is less than a quantity of code block groups obtained after the transport block is segmented, and the M code block groups include $C_t$ code blocks; and performing rate matching on the $C_t$ code blocks, where a length of a rate matching output sequence of each of the $C_t$ code blocks satisfies the following conditions: when $j \le C_t - \gamma - 1$, $E = N_L \cdot Q_m \cdot \lceil G'/C_t \rceil$; or when $j > C_t - \gamma - 1$, $E = N_L \cdot Q_m \cdot \lfloor G'/C_t \rfloor$. In the method, an output of rate matching is based on a retransmitted code block group, so that air interface resources can be more fully used.

According to a fourth aspect, an embodiment of this application further provides a communications apparatus. The communications apparatus may be configured to implement the communications method according to the third aspect. The communications apparatus may be a terminal, a base station, a baseband chip, a data signal processing chip, or a general-purpose chip.

Optionally, the method and the apparatus that are provided in this application may be applicable to a communications system using LDPC.

In another optional design, the communications apparatus according to the second aspect or the fourth aspect includes a processor and a memory. The memory is configured to store an instruction for implementing the foregoing communications methods, and the processor is configured to execute the instruction to implement the foregoing communications method.

In another optional design, the communications apparatus according to the second aspect or the fourth aspect includes a processor and a memory. The memory is coupled to the processor, and the processor is configured to implement a corresponding processing process, including but not limited to: obtaining an input sequence for rate matching, where the input sequence is an initial transmission sequence or a retransmission sequence corresponding to a transport block, the input sequence includes M code block groups, and a value of M is less than or equal to a quantity of code block groups obtained after the transport block is segmented; and obtaining a soft buffer size $B_j$ corresponding to a $j^{th}$ code block in the M code block groups, where a value of $B_j$ is determined based on a length $K_w$ of the $j^{th}$ code block after being encoded, a quantity $C_t$ of code blocks included in the M code block groups, and a soft buffer size $N_{IR}$ of the transport block; determining, based on $B_j$, a bit set used for transmission; and obtaining a rate matching output sequence based on the bit set.

Optionally, the communications apparatus may further include a transceiver machine.

An embodiment of this application further provides a computer program product, and when the computer program product is executed on a computer, the computer is caused to implement the foregoing communications method.

An embodiment of this application further provides a computer readable storage medium, the medium stores an instruction, and when the instruction is executed on a computer, the computer is caused to implement the foregoing communications method.

BRIEF DESCRIPTION OF DRAWINGS

To describe technical solutions in this application more clearly, the following briefly describes the accompanying drawings required for describing the embodiments.

DESCRIPTION OF EMBODIMENTS

The following describes the embodiments of this application with reference to accompanying drawings in this application.

The following provides descriptions of some terms and agreements in this application.

A bit sequence is a sequence consisting of bits "0" and/or "1". A length of the bit sequence is a quantity of bits included in the bit sequence. For example, a bit sequence 00 includes two bits, and a length of the bit sequence is 2; a bit sequence 111 includes three bits, and a length of the bit sequence is 3; a bit sequence "0100" includes four bits, and a length of the bit sequence is 4.

Both a transport block (TB) and a code block (CB) may be considered as a bit sequence. A code block is obtained after a transport block or a processed transport block is segmented, and is an object of encoding. Therefore, in this application, a length of a code block is a quantity of bits included in a bit sequence corresponding to the code block, and the length of the code block may also be referred to as a size of the code block. A length of a transport block is a quantity of bits included in a bit sequence corresponding to the transport block, and the length of the transport block may also be referred to as a size of the transport block. It may be understood that with development of technologies, the trans- port block or the code block may be named as different terms. In the embodiments of this application, a transport block obtained after processing may also be understood as a transport block, and the processing may be adding a check bit, for example, adding a cyclic redundancy check (CRC) bit to an initial transport block. The processing is not limited in this application.

In the embodiments of this application, a communications apparatus is an apparatus having a communications function. For example, the communications apparatus may be a base station, a terminal, a chip, or the like. The chip may be, for example, a baseband chip or a communications chip.

Figure 1:
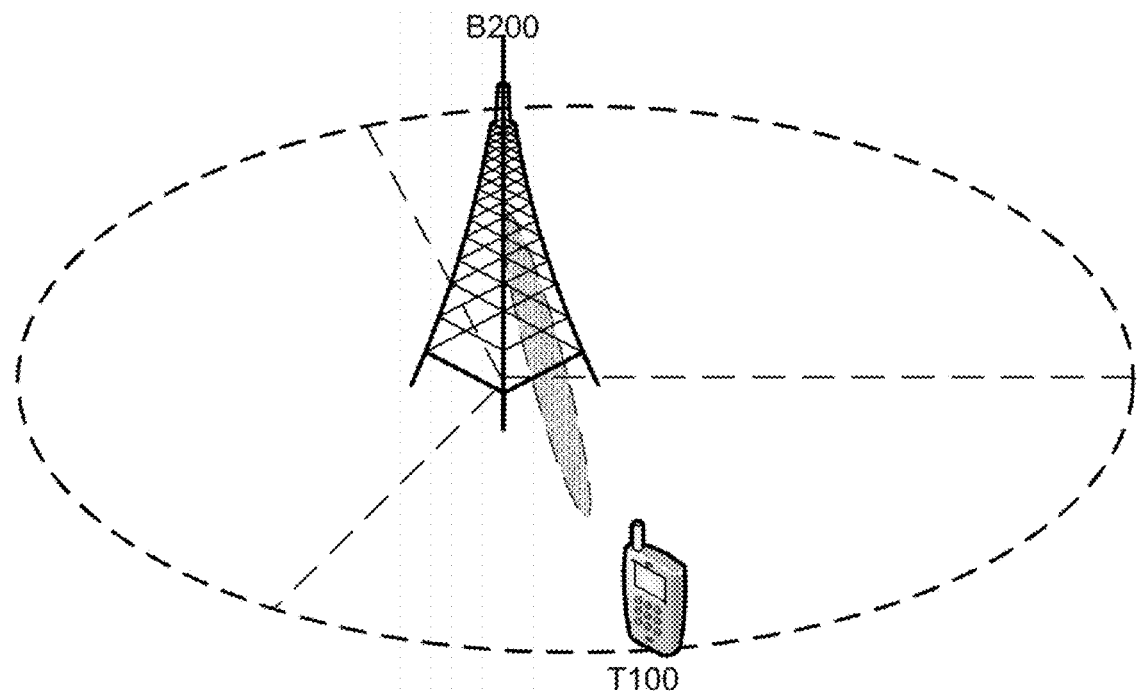
FIG. 1 is a simplified schematic diagram of a wireless communications system.

The technical solution in the embodiments of this application may be applicable to a wireless communications system shown in FIG. 1. As shown in FIG. 1, the wireless communications system includes at least one base station B200 and at least one terminal T100 (only one is shown in FIG. 1). The base station B200 may communicate with the terminal T100 by using different communication resources. For example, the base station B200 may communicate with the terminal T100 by using a wide beam and/or a narrow beam. The wireless communications system may be a 4G communications system such as a long term evolution (LTE) system, a 5G communications system such as a new radio (NR) system, a communications system integrating various communications technologies (for example, a communications system integrating an LTE technology and an NR technology), a subsequent evolved system, or the like. Both the base station B200 and the terminal T100 may be used as a sending device or a receiving device. In an uplink, the terminal is used as a sending device, and the base station is used as a receiving device. In a downlink, the base station is used as a sending device, and the terminal is used as a receiving device. It may be understood that the wireless communications system may include a radio access network and a core network. The radio access network includes the base station B200, and may include another access device such as a relay node or other device. The core network may include a core network device such as a mobility management entity or other controlling or storage device.

In this application, the terminal T100 is a device having a wireless communications function. The terminal may be, for example, a handheld device, an in-vehicle device, a wearable device, or a computing device that has a wireless communications function, or other processing device connected to a wireless modem. The terminal may be referred to as a different name in a different network, for example, user equipment, a mobile station, a user unit, a station, a cellular phone, a personal digital assistant, a wireless modem, a wireless communications device, a handheld device, a laptop computer, a cordless telephone set, or a wireless local loop station. It should be noted that for ease of understanding and graphical representation, an example in which the terminal T100 is a mobile phone is used in FIG. 1 and FIG. 2.

Figure 2:
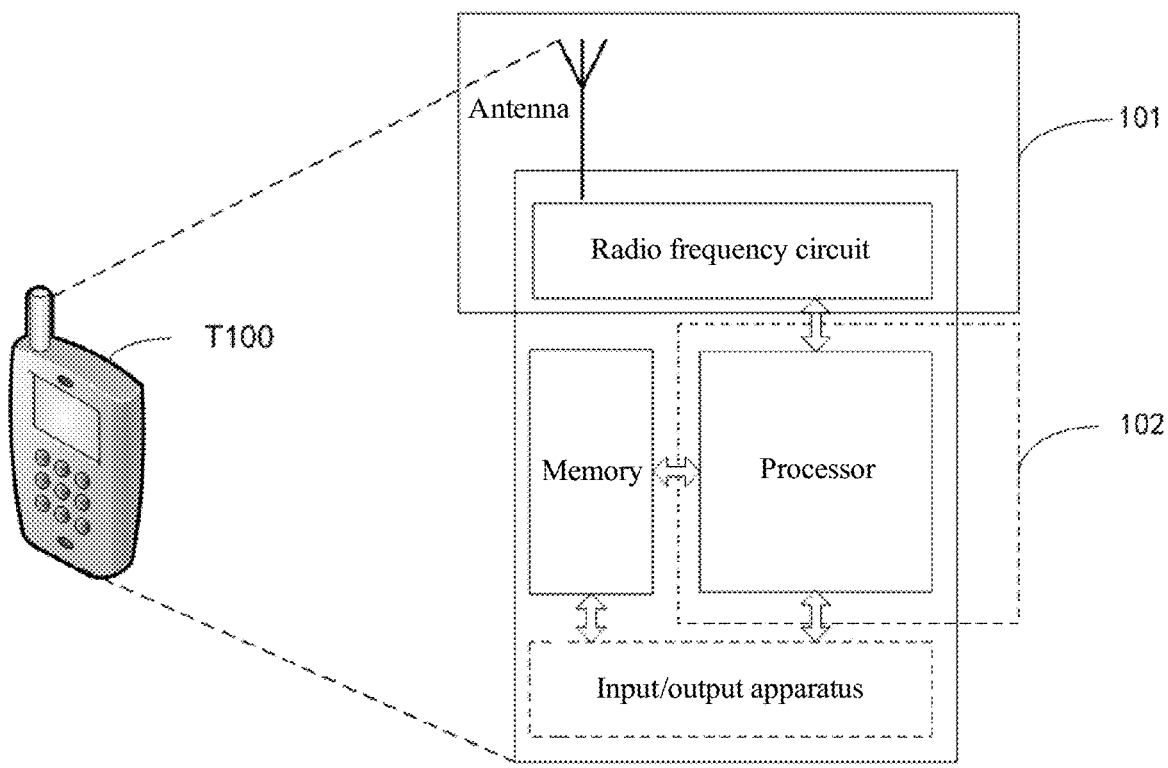
FIG. 2 is a simplified schematic diagram of the structure of a terminal.

FIG. 2 is a schematic structural diagram of a terminal T100. As shown in FIG. 2, the terminal T100 includes a processor, a memory, a radio frequency circuit, an antenna, and an input/output apparatus. The processor is mainly configured to: process a communication protocol and communication data, control the terminal, execute a software program, process data of the software program, and the like. The memory is mainly configured to store the software program and data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display, a keyboard or the like, is mainly configured to: receive data input by a user and output data to the user. It should be noted that some types of terminals may not have the input/output apparatus.

When needing to send data, after performing baseband processing on to-be-sent data, the processor outputs a baseband signal to the radio frequency circuit; and the radio frequency circuit performs radio frequency processing on the baseband signal and sends the radio frequency signal in a form of an electromagnetic wave by using the antenna. When data is sent to the terminal, the radio frequency circuit receives a radio frequency signal by using the antenna, converts the radio frequency signal into a baseband signal, and outputs the baseband signal to the processor. The processor converts the baseband signal into data and processes the data.

For ease of description, FIG. 2 shows only one memory and processor. In an actual terminal product, there may be one or more processors and one or more memories. The memory may also be referred to as a storage medium, a storage device, or the like. The memory may be disposed independent of the processor, or may be integrated with the processor. This is not limited in the embodiments of this application.

In an optional implementation, the processor may include a baseband processor and/or a central processing unit. The baseband processor is mainly configured to process a communication protocol and communication data. The central processing unit is mainly configured to control the entire terminal, execute a software program, and process data of the software program. The processor in FIG. 2 may integrate functions of the baseband processor and the central processing unit. Persons skilled in the art may understand that the baseband processor and the central processing unit may alternatively be processors independent of each other. Optionally, the terminal may include a plurality of baseband processors, to adapt to different network standards. Optionally, the terminal may include a plurality of central processing units, to enhance a processing capability of the terminal. Optionally, the functions of the baseband processor and the central processing unit may be integrated into one processor. Optionally, components of the terminal may be connected by using various buses. The baseband processor may also be referred to as a baseband processing circuit or a baseband processing chip. The central processing unit may also be referred to as a central processing circuit or a central processing chip. Optionally, a function of processing the communication protocol and the communication data may be built in the processor, or may be stored in a storage unit in a form of a software program. The processor executes the software program, to implement a baseband processing function.

In the embodiments of this application, the antenna and the radio frequency circuit that have receiving and sending functions may be considered as a transceiver unit of the terminal, and the processor having a processing function is considered as a processing unit of the terminal. As shown in FIG. 2, the terminal T100 includes a transceiver unit 101 and a processing unit 102. The transceiver unit may also be referred to as a transceiver, a transceiver machine, a transceiver apparatus, or the like. The processing unit may also be referred to as a processor, a processing board, a processing module, a processing apparatus, or the like. Optionally, a component for implementing a receiving function in the transceiver unit 101 may be considered as a receiving unit, and a component for implementing a sending function in the transceiver unit 101 may be considered as a sending unit, that is, the transceiver unit 101 includes a receiving unit and a sending unit. Sometimes, the transceiver unit may also be referred to as a transceiver machine, a transceiver, a transceiver circuit, or the like. The receiving unit may also be referred to as a receiving machine, a receiver, a receiving circuit, or the like sometimes. The sending unit may also be referred to as a transmitting machine, a transmitter, a transmitting circuit, or the like sometimes.

Figure 3:
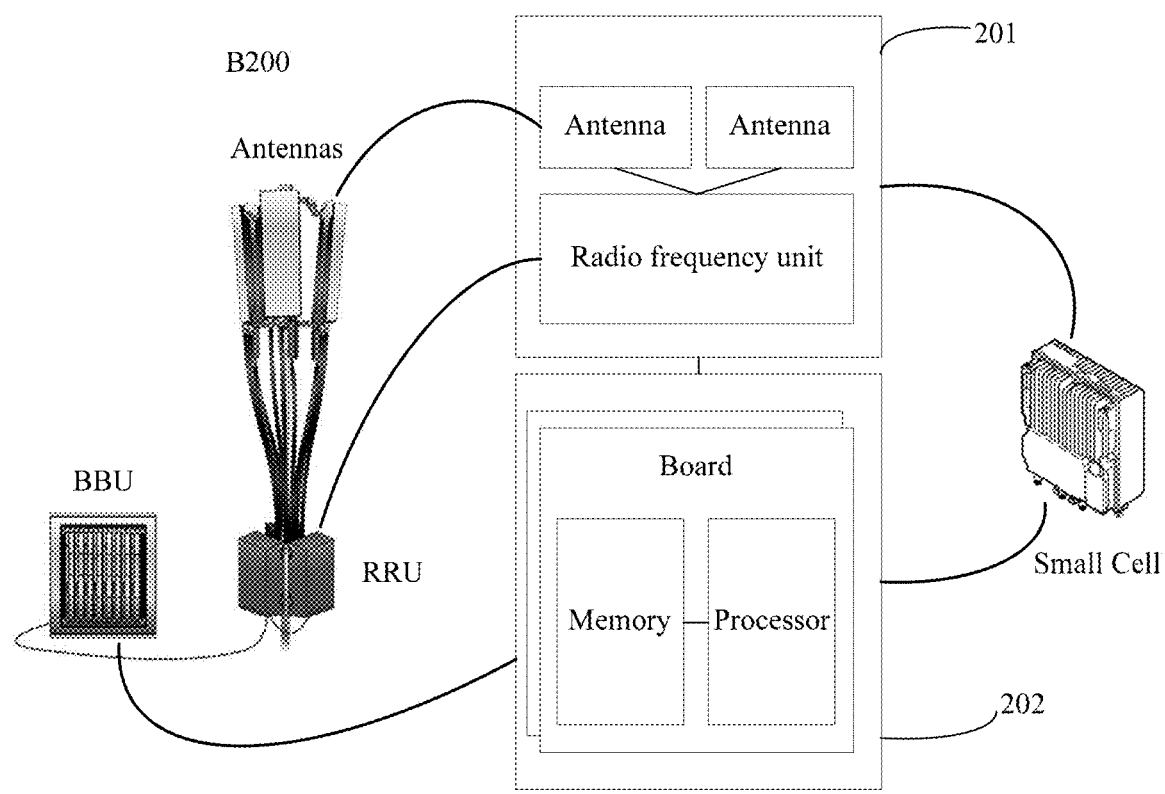
FIG. 3 is a simplified schematic diagram of the structure of a base station.

The base station B200 may also be referred to as a base station device, and is a device that is deployed in a radio access network for providing a wireless communications function. For example, a base station in an LTE network is referred to as an evolved NodeB (eNB, or eNodeB), and a base station in an NR network is referred to as a transmission reception point (TRP) or a generation NodeB/next-generation NodeB (gNB). FIG. 3 is a schematic structural diagram of the base station B200. The base station B200 shown in FIG. 3 may be a distributed base station. For example, a distributed base station including antennas, a remote radio unit (RRU), and a baseband unit (BBU) is shown on the left of FIG. 3. The base station shown in FIG. 3 may alternatively be an integrated base station, for example, a small cell shown on the right of FIG. 3. It may be understood that FIG. 3 merely provides an embodiment of the base station, and a physical structure of the base station may alternatively be in another form which is not limited in this application. Generally, the base station includes a part 201 and a part 202. The part 201 is mainly configured to: receive and send a radio frequency signal, and perform conversion between a radio frequency signal and a baseband signal. The part 202 is mainly configured to: perform baseband processing, control the base station, and the like. The part 201 may be generally referred to as a transceiver unit, a transceiver machine, a transceiver circuit, a transceiver, or the like. The part 202 is usually a control center of the base station, and is usually referred to as a processing unit.

In an optional implementation, the part 201 is a transceiver unit, and may also be referred to as a transceiver machine, a transceiver, or the like. The part 201 includes an antenna and a radio frequency unit, and the radio frequency unit is mainly configured to perform radio frequency processing. Optionally, a component for implementing a receiving function in the part 201 may be considered as a receiving unit, and a component for implementing a sending function may be considered as a sending unit, that is, the part 201 includes a receiving unit and a sending unit. The receiving unit may also be referred to as a receiving machine, a receiver, a receiving circuit, or the like. The sending unit may also be referred to as a transmitting machine, a transmitter, a transmitting circuit, or the like.

In an optional implementation, the part 202 may include one or more boards. Each board may include one or more processors and one or more memories, and the processor is configured to read and execute a program in the memory, to implement a baseband processing function and control the base station. If there are a plurality of boards, the boards may be interconnected to enhance a processing capability. In an optional implementation, alternatively, the plurality of boards may share one or more processors, or the plurality of boards share one or more memories, or the plurality of boards share one or more processors at the same time.

It may be understood that FIG. 1 to FIG. 3 are only embodiments, and this application is not limited thereto.

Figure 4:
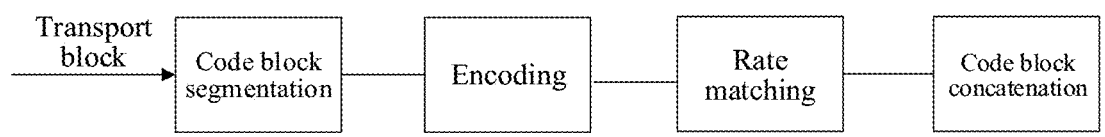
FIG. 4 shows an example of a bit sequence processing process.

It should be noted that before sending a bit sequence to a receiving device, a sending device performs processes such as segmentation encoding, rate matching, and code block concatenation on the bit sequence, as shown in FIG. 4.

It may be understood that the foregoing processes such as segmentation, encoding, rate matching, and code block concatenation may be implemented by the processor in FIG. 3 or FIG. 2.

An objective of rate matching is to adjust a code rate to an expected output code rate. In a circular buffer rate matching algorithm, L coded bits may be selected as an output of circular buffer rate matching based on the expected output code rate, different code rates may be obtained by adjusting a quantity of coded bits which are read. In the circular buffer rate matching, reading L coded bits from a specified start location in a buffer is referred to as bit selection. Generally, bits selected for transmission may be read starting from any location in the buffer. If the end of the buffer is reached, data may be continued to be read from the start location in the buffer. Therefore, circular buffer-based rate matching may be implemented by using a simple method. For a hybrid automatic repeat request (HARQ), a circular buffer has advantages in flexibility and granularity.

The HARQ is a very important link adaptation technology in a digital communications system. A receiving end decodes a packet received by the receiving end, and if the decoding succeeds, an acknowledgement (ACK) signal is fed back to a transmitting end, to request the transmitting end to send a new packet; or if the decoding fails, a negative acknowledgement (NACK) signal is fed back to the transmitting end, to request the transmitting end to re-send the packet. A decoding success rate of the receiving end can be increased by decoding, by the receiving end, a packet that is retransmitted for a plurality of times, thereby achieving a high reliability requirement of link transmission. In a HARQ manner, different locations in a circular buffer may be specified as start locations from which transmission data is read. A plurality of start locations from which transmission data is read in the circular buffer are determined based on a definition of a redundancy version (RV). A specific start location from which data transmitted this time is read in the circular buffer is determined based on a value of the redundancy version.

Assuming that a code rate is 1/3, a length of a code block after being encoded is 96, and there are four RVs, which are respectively an RV 0, an RV 1, an RV 2, and an RV 3, if 64 bits are read starting from the RV 0 to generate a code book, a code rate obtained after rate matching is $$R = \frac{1/3}{64/96} = 1/2;$$

or if 128 bits are read, a code rate obtained after rate matching is $$R = \frac{1/3}{128/96} = 1/4.$$

Due to a factor such as a capability of the receiving end, a soft information buffer (also referred to as a soft buffer) at the receiving end may be limited. When rate matching is performed at the transmitting end, a soft buffer size of the receiving end is considered, and by limiting to-be-sent data, it can be ensured that soft information received by the receiving end can be stored in the soft buffer and does not overflow.

It may be understood that the soft buffer size is a quantity of stored soft information. For example, when each piece of soft information is 8-bit data, the soft buffer size means that how many pieces of 8-bit data can be stored. However, 8-bit soft information at the receiving end corresponds to one bit at the transmitting end. Therefore, at the transmitting end, it is the soft buffer size being used, but bit-level data is actually stored.

Figure 5:
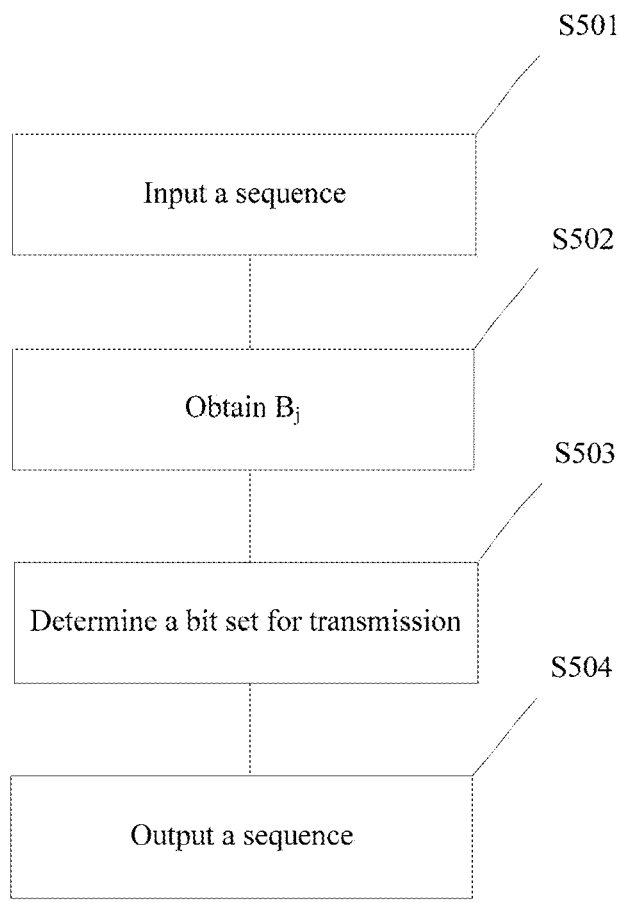
FIG. 5 is a schematic flowchart of a communications method according to an embodiment of this application.

This application provides a communications method. The method may be applicable to a communications system in which transmission is performed based on a code block group, for example, a communications system in which encoding is performed by using LDPC. The foregoing transmission may include initial transmission and/or retransmission. The communications method is implemented by a communications apparatus. It may be understood that in an embodiment of this application, the communications apparatus implements a method performed at a transmitting end. In this application, a device at the transmitting end may also be referred to as a first device. As shown in FIG. 5, the method may include the following steps.

S501. Obtain an input sequence, where the input sequence includes M code block groups, and a value of M is less than or equal to a quantity of code block groups obtained after a transport block is segmented.

The input sequence is an initial transmission sequence or a retransmission sequence corresponding to the transport block. The input sequence is an input sequence for rate matching, an output of an encoder may be considered as an input sequence of a rate matching module.

The input sequence herein may be retransmission data or may be initially transmission data. As shown in FIG. 4, a transport block or a processed transport block is input for a code block segmentation operation. The code block segmentation operation herein may include segmenting the transport block or the processed transport block into at least one code block, the at least one code block may be divided into at least one code block group. A quantity of code block groups may be determined before the code block segmentation, or may be determined after the code block segmentation. Optionally, one or more code block group check bits may be added for each code block group according to a system design requirement. This is not limited in this embodiment of this application. For ease of description, in this embodiment of this application, the code block group included in the at least one code block obtained after the code block segmentation is performed on the transport block or the processed transport block is referred to as a code block group included in the transport block for short below.

In this embodiment, the input sequence includes the M code block groups. In a scenario which the input sequence is initially transmission data, the M code block groups are the code block groups included in the transport block. For example, it is assumed that the transport block includes four code block groups and it is learned, based on an ACK fed back by a receiving end, that the first code block group is correctly received. Then, the last three code block groups may be retransmitted, that is, a quantity of retransmitted code block groups is less than a quantity of initially transmitted code block groups. After the code block group for retransmission is determined, the code block group may be re-encoded before rate matching, or may not be re-encoded. This is not limited in this embodiment of this application.

S502. Obtain a soft buffer size $B_j$ corresponding to a $j^{th}$ code block in the M code block groups.

A value of $B_j$ may be determined based on at least one of the following parameters: a length $K_w$ of the $j^{th}$ code block after being encoded, a quantity $C_t$ of code blocks included in the M code block groups, a soft buffer size $N_{IR}$ of the transport block, and a maximum available length $N_{max}$ of an encoded code block.

For example, in some implementations, $B_j=K_w$. For another example, in some implementations, $B_j=\min(\lfloor N_{IR}/C_t \rfloor, K_w)$. For still another example, in some implementations, $B_j=\min(\lfloor N_{IR}/C_t \rfloor, K_w, N_{max})$.

$\lfloor \ \rfloor$ represents rounding down, $K_w$ represents the length of the $j^{th}$ code block after being encoded, $C_t$ represents the quantity of code blocks included in the M code block groups, $N_{IR}$ represents the soft buffer size of the transport block, and $N_{max}$ represents the maximum available length of the encoded code block.

It may be understood that the foregoing formulas that $B_j$ satisfies are only examples for description, and a variation may be made based on any of the foregoing formulas, for example, the rounding down may be changed to rounding up, or $\lfloor N_{IR}/C_t \rfloor$ or $N_{max}$ in the foregoing formulas may be weighted. This is not limited in this embodiment of this application.

Corresponding soft buffer sizes may be determined for the code blocks in the M code block groups after the code block groups included in the input sequence are learned of. Optionally, corresponding soft buffer sizes of the code blocks may be determined by using same methods.

In an implementation, the rate matching module may be notified of $K_w$ by the encoder after the encoder performs encoding, or the rate matching module may learn of $K_w$ in another manner. This is not limited in this embodiment of this application.

A value of the soft buffer size $N_{IR}$ of the transport block is related to a level of a device at the receiving end (also referred to as a second device). For example, $N_{IR}$ may be learned of by using the following formula (1):

$$N_{IR} = \left\lfloor \frac{N_{soft}}{K_C \cdot K_{MIMO} \cdot \min(M_{DL\_HARQ}, M_{limit})} \right\rfloor \quad (1)$$

$N_{soft}$ represents a quantity of soft information bits (soft channel bits) corresponding to a capability level of the device at the receiving end; a value of $K_C$ is determined by $N_{soft}$; $M_{DL\_HARQ}$ represents a maximum quantity of downlink HARQ processes; $M_{limit}$ is a predefined constant, for example, may be 8; and $K_{MIMO}$ is a parameter corresponding to a transmission mode, for example, $K_{MIMO}$ may be 2 in some transmission modes, and $K_{MIMO}$ may be 1 in some transmission modes. This is not limited in this embodiment of this application. The foregoing formula (1) may be understood as reserving a resource for each process by dividing the soft buffer based on a quantity of processes.

In a possible implementation, the value of $N_{IR}$ may be obtained by looking up a table based on the capability level of the device at the receiving end. For example, $N_{soft}$ may be learned of by querying a table, $K_C$ may be determined based on a value of $N_{soft}$, and then $N_{IR}$ is finally obtained based on the formula (1).

$$N_{max} = P + K_{max} / R_{min, K_{max}}, \text{ where } R_{min, K_{max}}$$

is a minimum code rate corresponding to a maximum available length $K_{max}$ of a code block in the encoder, a value of $R_{min, K_{max}}$ may be preset in a standard, and the parameter P may be 0 or a quantity of punctured information bits. This is not limited in this embodiment of this application.

S503. Determine, based on $B_j$, a bit set used for transmission.

Figure 6:
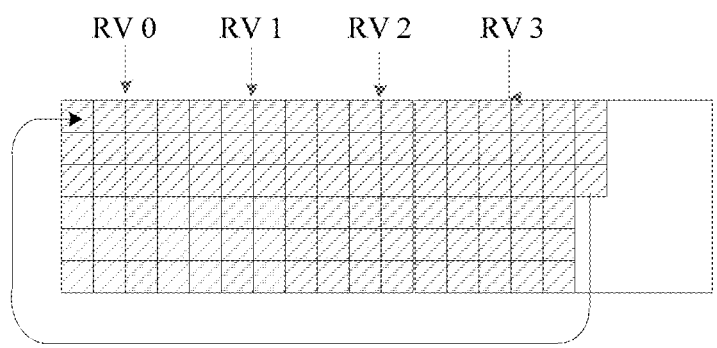
FIG. 6 is a schematic diagram of a bit set for transmission according to an embodiment of this application.

$B_j$ determined in S502 limits the bit set that is transmitted. As shown in FIG. 6, a white area (a part without slashes) in FIG. 6 indicates a bit set that cannot be transmitted due to a limitation on a soft buffer size in a circular buffer, and a part with slashes indicates a bit set that may be transmitted. A quantity of bits included in the bit set that may be transmitted is determined based on the soft buffer size. The foregoing bit set transmitted is data that is read in the circular buffer. For example, the soft buffer size determined in S502 is 300 and $K_w$ is 400, a size of the circular buffer is 400. In this case, the former 300 bits in an encoded bit sequence are used as a bit set used for transmission. Optionally, the bit set used for transmission may include one or more filler bit.

S504. Obtain a rate matching output sequence based on the bit set.

The rate matching output sequence is a bit sequence obtained after bits are read with reference to an RV and based on the bit sequence. For example, reading is started from a start location corresponding to an RV 0, and a read length is determined based on a transmission bit length for each code block. The read length is a length of the rate matching output sequence.

Optionally, when the bit set includes one or more filler bits, the one or more filler bits may be skipped during reading.

In this embodiment of this application, a soft buffer size of each code block during rate matching is determined based on a factor as actually sent code block groups, and soft buffer resources can be fully used as many as possible, thereby improving performance.

Further, especially in a buffer-limited scenario, a buffer of each code block during initial transmission is limited. In this case, a code rate of each code block (excluding a repetition part) is relatively high, and coding gain is relatively limited. For example, if an information bit length K of a code block before being encoded is 6000, after the code block is encoded with a code rate of 1/3, a length of the code block after being encoded is 18000. In this case, if a soft buffer of the code block is limited and has a size of only 12000, the code block can only be encoded with a code rate of 1/2 to 12000, and then 6000 bits are repeated. Thus, a part of coding gain is lost. However, by using the method in this embodiment of this application, only part of the code block groups are retransmitted, and soft buffers are re-allocated during the retransmission, so that each code block may be allocated a larger soft buffer, thereby obtaining a greater coding gain. For example, in the foregoing example, assuming that each code block group includes only one code block, if there are two code block groups in initial transmission and only one code block group needs to be retransmitted, an available buffer size of the retransmitted code block group may be increased to 24000, so that the retransmitted code block group may be with a code rate of 1/3.

Several possible manners for determining the soft buffer size corresponding to the $j^{th}$ code block are described below by using specific examples.

In a possible implementation, when a value of $K_w$ is limited by $N_{max}$ and the soft buffer size $N_{IR}$ of the transport block, the soft buffer size $B_j$ corresponding to the $j^{th}$ code block is equal to $K_w$, that is, the value of $B_j$ satisfies the formula: $B_j=K_w$.

That is, when $N_{max}$ and $N_{IR}$ are considered for the output of the encoder, and a length of an encoded code block does not exceed $N_{max}$ and $\lfloor N_{IR}/C_t \rfloor$, $B_j$ may be determined to be $K_w$, and $\lfloor N_{IR}/C_t \rfloor$ may be understood as how many of $N_{IR}$ is allocated to each code block.

In this implementation, limitations of $N_{max}$ and the soft buffer size of the transport block on the length of the encoded code block are completed in an encoding phase, so that redundant bits during rate matching are reduced, and complexity is relatively low.

It may be understood that the foregoing manner for determining $B_j$ may also be applicable to another scenario. For example, $B_j$ is directly determined to be $K_w$ without considering implementation of the encoder. This is not limited in this application.

In another possible implementation, when $K_w$ is limited by $N_{max}$, it is determined that the value of the soft buffer size $B_j$ corresponding to the $j^{th}$ code block satisfies the formula: $B_j=\min(\lfloor N_{IR}/C_t \rfloor, K_w)$. $\lfloor \ \rfloor$ represents rounding down.

That is, if $N_{max}$ is considered for the output of the encoder and no other factors are considered, when determining the soft buffer size corresponding to the code block, another factor such as $N_{IR}$ may be considered. It may be specifically: $B_j=\min(\lfloor N_{IR}/C_t \rfloor, K_w)$.

In this implementation, an algorithm used in the encoding phase is relatively simple and is relatively easy to implement.

It may be understood that this implementation may also be applicable to a scenario in which $N_{max}$ and $N_{IR}$ are considered in the encoding phase, or may also be applicable to another scenario. For example, $B_j$ is determined to be $\min(\lfloor N_{IR}/C_t \rfloor, K_w)$ without considering implementation of the encoder. This is not limited in this application.

In another possible implementation, the soft buffer size $B_j$ corresponding to the $j^{th}$ code block may be determined to be $\min(\lfloor N_{IR}/C_t \rfloor, K_w, N_{max})$, that is, the value of $B_j$ satisfies the formula $B_j=\min(\lfloor N_{IR}/C_t \rfloor, K_w, N_{max})$. $\lfloor \ \rfloor$ represents rounding down.

This implementation may be applicable to a scenario in which the output of the encoder is not limited by any factor. For example, the encoder performs encoding by directly using a lowest code rate. This implementation may also be applicable to a scenario in which the output of the encoder is limited by one or more factors such as $N_{max}$ and $N_{IR}$. This is not limited in this embodiment of this application. In this implementation, the encoder merely needs to complete a relatively simple encoding operation, and other limitations are completed during rate matching. Thus, functions implemented in different phases are more clearly defined.

Optionally, according to the foregoing various manners for determining $B_j$, it may be understood that the value of $B_j$ is related to the length $K_w$ of the PI code block after being encoded, the quantity $C_t$ of code blocks included in the M code block groups, the soft buffer size $N_{IR}$ of the transport block, and the maximum available length $N_{max}$ of the encoded code block.

Optionally, in the foregoing embodiment, the length of the rate matching output sequence may satisfy the following conditions:

when $j \leq C_t-\gamma-1$, $E=N_L \cdot Q_m \cdot \lfloor G'/C_t \rfloor$; or when $j > C_t-\gamma-1$, $E=N_L \cdot Q_m \cdot \lceil G'/C_t \rceil$, where $G'=G/(N_L \cdot Q_m)$, $\gamma=G'$ mod $C_t$, $Q_m$ is a modulation order, $N_L$ is a quantity of data flows, and $G$ is a quantity of available bits used for transmitting the transport block.

It may be understood that $N_L$ mainly occurs in a multi-antenna scenario. For example, in a transmit diversity mode, two orthogonal signals are generated from each modulation symbol by using a series of operations, and the two signals are simultaneously sent from two antennas. In this case, $N_L=2$. However, in a multiplexing mode, $N_L$ is equal to a quantity of actually sent data flows.

The length of the rate matching output sequence may be determined based on a quantity of bits used for transmitting each code block. The length is determined based on air interface resources (i.e., a quantity of RBs) and a quantity of code blocks of the entire transport block. For example, all air interface resources may be evenly allocated to each code block. It should be noted that the foregoing method for determining the rate matching output sequence may be applicable to S504, or may be independent of the embodiment shown in FIG. 5, that is, may be applicable to any scenario based on code block group retransmission. The method is not limited to being based on the manner for determining the soft buffer size corresponding to the $j^{th}$ code block in the embodiment in FIG. 5.

For example, furthermore, an embodiment of this application provides a communications method. The method may be applicable to a retransmission scenario, and includes but is not limited to the following steps:

obtaining an input sequence for rate matching, where the input sequence is a retransmission sequence corresponding to a transport block, the input sequence includes M code block groups, a value of M is less than a quantity of code block groups obtained after the transport block is segmented, and the M code block groups include $C_t$ code blocks; and performing rate matching on the $C_t$ code blocks, where a length of a rate matching output sequence of each of the $C_t$ code blocks satisfies the following conditions: when $j \leq C_t-\gamma-1$, $E=N_L \cdot Q_m \cdot \lfloor G'/C_t \rfloor$; or when $j > C_t-\gamma-1$, $E=N_L \cdot Q_m \cdot \lceil G'/C_t \rceil$.

In this method, an output of rate matching is based on a retransmitted code block group, so that air interface resources can be more fully used.

It may be understood that at the receiving end, de-rate matching and decoding may be performed in a corresponding manner. For example, for each code block, a soft buffer size is calculated based on a method the same as the method used at the transmitting end, a de-rate matching operation is performed on the received soft information based on the soft buffer size, and a de-rate matching module outputs a soft information sequence having a length less than or equal to the soft buffer size to a decoder for decoding. An apparatus at the receiving end may be located in the second device, and may include corresponding functional units to implement the foregoing functions. For example, the apparatus at the receiving end may include: a memory configured to store an instruction; and a processor configured to execute the instruction, to implement the foregoing processes of de-rate matching and decoding that are completed at the receiving end.

Figure 7:
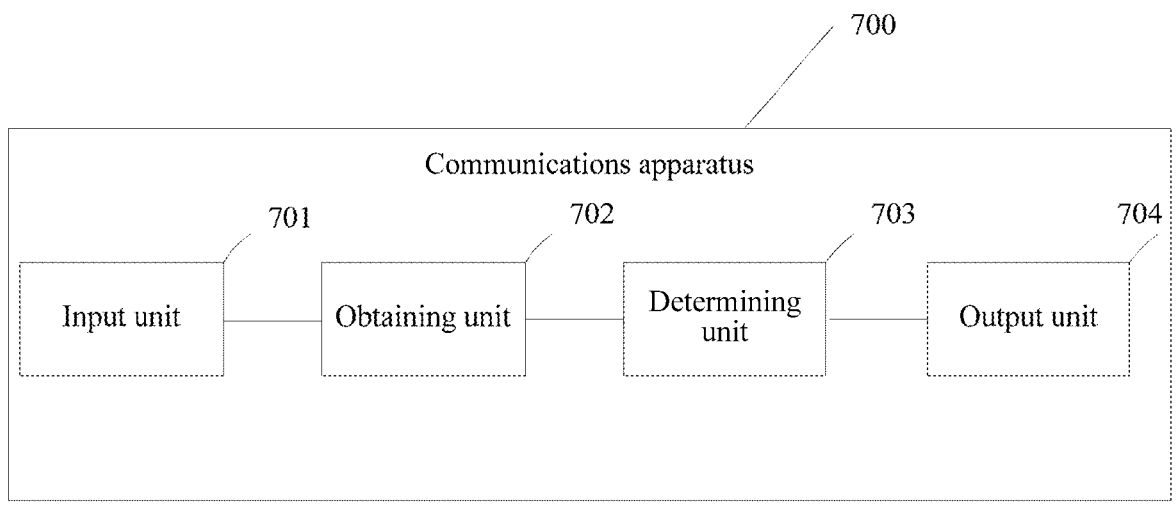
FIG. 7 is a schematic diagram of the structure of a communications apparatus according to an embodiment of this application.

An embodiment of this application further provides a communications apparatus 700. The communications apparatus is configured to implement the method performed at the transmitting end, for example, in the first device, in the foregoing embodiment. The communications apparatus may be a terminal, a base station, a baseband chip, a data signal processing chip, a general-purpose chip, etc. As shown in FIG. 7, the apparatus may include:

an input unit 701, configured to obtain an input sequence, where the input sequence includes M code block groups, and a value of M is less than or equal to a quantity of code block groups obtained after a transport block is segmented;

an obtaining unit 702, configured to obtain a soft buffer size Bj corresponding to a jth code block in the M code block groups, where the soft buffer size corresponding to the jth code block is determined based on at least one of a length $K_w$ of the jth code block after being encoded, a quantity $C_t$ of code blocks included in the M code block groups, a soft buffer size $N_{IR}$ of the transport block, and a maximum available length $N_{max}$ of an encoded code block;

a determining unit 703, configured to determine, based on the soft buffer size corresponding to the $j^{th}$ code block, a bit set for transmission; and an output unit 704, configured to obtain a rate matching output sequence based on the bit set determined by the determining unit 703.

It may be understood that the foregoing units may be independent logical functional modules, or may be implemented by using an integrated functional unit. This is not limited in this embodiment of this application. Further, specific functions and implementations of the foregoing units can refer to the method embodiments and the related descriptions of FIG. 1 to FIG. 6.

An embodiment of this application further provides a communications apparatus. The communications apparatus may be a terminal, a base station, a baseband chip, a data signal processing chip, a general-purpose chip, etc.

The communications apparatus includes: an input unit, configured to obtain an input sequence, where the input sequence is a retransmission sequence corresponding to a transport block, the input sequence includes M code block groups, a value of M is less than a quantity of code block groups obtained after the transport block is segmented, and the M code block groups include $C_t$ code blocks; and a rate matching unit, configured to perform rate matching on the $C_t$ code blocks, where a length of a rate matching output sequence of each of the $C_t$ code blocks satisfies the following conditions: when $j \leq C_t - \gamma - 1$, $E = N_L \cdot Q_m \cdot \lfloor G'/C_t \rfloor$; or when $j > C_t - \gamma - 1$, $E = N_L \cdot Q_m \cdot \lceil G'/C_t \rceil$, where $G' = G/(N_L \cdot Q_m)$, $\gamma = G' \mod C_t$, $Q_m$ is a modulation order, $N_L$ is a quantity of data flows, and G is a quantity of available bits used for transmitting the transport block. The input unit and the rate matching unit in this embodiment may be implemented by using the processor shown in FIG. 2 and FIG. 3 or the rate matching module shown in FIG. 4. For some related descriptions, refer to descriptions in the foregoing embodiments, and details are not described herein again.

Figure 8:
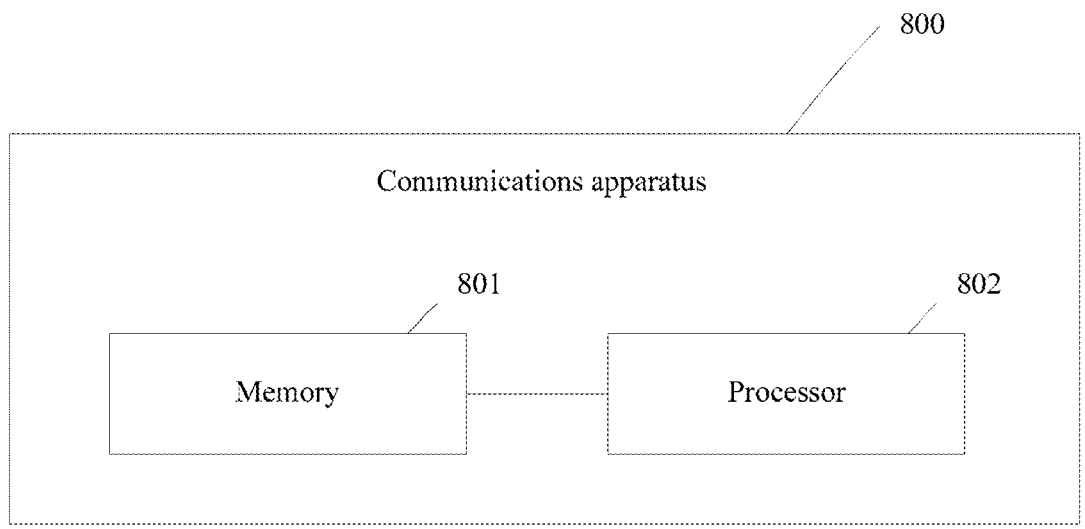
FIG. 8 is a schematic diagram of the structure of a communications apparatus according to another embodiment of this application.

Optionally, an embodiment of this application further provides a communications apparatus 800. As shown in FIG. 8, the apparatus may include a memory 801 and a processor 802. In different applications, the memory 801 and the processor 802 may have different functions.

In a possible implementation:

The memory 801 is coupled to the processor 802. The processor 802 is configured to: obtain an input sequence for rate matching, where the input sequence is an initial transmission sequence or a retransmission sequence corresponding to a transport block, the input sequence includes M code block groups, and a value of M is less than or equal to a quantity of code block groups obtained after the transport block is segmented; obtain a soft buffer size $B_j$ corresponding to a $j^{th}$ code block in the M code block groups, where a value of $B_j$ is determined based on a length $K_w$ of the $j^{th}$ code block after being encoded, a quantity $C_t$ of code blocks included in the M code block groups, and a soft buffer size $N_{IR}$ of the transport block; determine, based on $B_j$, a bit set used for transmission; and obtain a rate matching output sequence based on the bit set. Alternatively, the processor 802 is configured to: obtain an input sequence for rate matching, where the input sequence is a retransmission sequence corresponding to a transport block, the input sequence includes M code block groups, a value of M is less than a quantity of code block groups obtained after the transport block is segmented; and the M code block groups include $C_t$ code blocks; and perform rate matching on the $C_t$ code blocks, where a length of a rate matching output sequence of each of the $C_t$ code blocks satisfies the following conditions: when $j \leq C_t - \gamma - 1$, $E = N_L \cdot Q_m \cdot \lfloor G'/C_t \rfloor$; or when $j > C_t - \gamma - 1$, $E = N_L \cdot Q_m \cdot \lceil G'/C_t \rceil$.

In another possible implementation:

The entire output sequence or a part of the output sequence of an encoder may be stored in the memory 801.

Herein, the output sequence stored in the memory may be the input sequence described in the foregoing embodiments. Each of the $C_t$ code blocks included in the input sequence may correspond to a virtual buffer. A size of the virtual buffer (also referred to as a circular buffer) may be equal to $K_w$.

It may be understood that the memory 801 may be a register, a random access memory (RAM), a cache register (cache), a flash memory, a ROM memory, an EPROM memory, an EEPROM memory, a hard disk, a removable hard disk, a CD-ROM, or any storage medium of another form well-known in the art. This is not limited in this embodiment of this application.

The processor 802 may be configured to implement the functions of the obtaining unit 702, the determining unit 703, and the output unit 704 in the embodiment shown in FIG. 7, and details are not described herein again. Alternatively, the processor 802 may further be configured to perform rate matching on the $C_t$ code blocks, where a length of a rate matching output sequence of each of the $C_t$ code blocks satisfies the following conditions: when $j \leq C_t - \gamma - 1$, $E = N_L \cdot Q_m \cdot \lfloor G'/C_t \rfloor$; or when $j > C_t - \gamma - 1$, $E = N_L \cdot Q_m \cdot \lceil G'/C_t \rceil$.

Alternatively, in another possible implementation:

The memory 801 may be configured to store an instruction for implementing the communications methods described in the foregoing embodiments, and the processor 802 may be configured to execute the foregoing instruction to implement the communications methods described in the foregoing embodiments. It may be understood that in the foregoing cases, the memory 801 and the processor 802 may be independent of each other, or may be integrated on a chip. Existence forms of the memory 801 and the processor 802 are not limited in this embodiment of this application.

According to the communications apparatus in the embodiments of this application, a soft buffer size of each code block during rate matching is determined based on a factor such as a quantity of actually sent code block groups, so that a shorter block length can support a code rate lower than a code rate that can be supported by a longer block length, and the soft buffer size is not increased, thereby improving rate matching performance.

It should be noted that in addition to the functional units shown in the accompanying drawings, the communications apparatus provided in the embodiments of FIG. 7 and FIG. 8 may further include other unit. This is not limited in this embodiment of this application. For example, the communications apparatus may further include a unit for implementing receiving and sending functions.

It should be noted that the processor mentioned in this application may be a central processing unit (CPU), a general-purpose processor, a digital signal processor (DSP), an application-specific integrated circuit (ASIC), a field programmable gate array (FPGA) or other programmable logic device, a transistor logic device, a hardware component, or any combination thereof. The processor may implement or perform various examples of logic blocks, modules, and circuits described with reference to content disclosed in this application. The processor may be a combination implementing a computing function, for example, a combination of one or more microprocessors, or a combination of a DSP and a microprocessor.

In the several embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of this application may be integrated into one unit, or each of the units may exist alone, or two or more units are integrated into one unit. The integrated unit may be implemented in a form of hardware, or may be implemented in a form of hardware in addition to a software functional unit.

The software functional part is stored in a storage unit and the storage unit includes several instructions for instructing a computer device (which may be a personal computer, a server, or a network device) or a processor to perform a part of the steps of the methods described in the embodiments of this application. The storage unit includes one or more memories such as a read-only memory (ROM), a random access memory (RAM), and an electrically erasable programmable read only memory (EEPROM). The storage unit may exist independent of each other, or may be integrated with the processor.

It may be clearly understood by persons skilled in the art that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or part of the functions described above. For a detailed working process of the foregoing apparatus, refer to a corresponding process in the foregoing method embodiments, and details are not further described herein.

It should be understood by persons skilled in the art that the first, the second, and various numbers in this specification are used for differentiation only for ease of description, instead of limiting the scope of the embodiments of this application.

It should be understood by persons skilled in the art that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

All or some of the foregoing embodiments may be implemented by using software, hardware, firmware, or any combination thereof. When the embodiments are implemented by using software, all or some of the embodiments may be implemented in a form of a computer program product. The computer program product includes one or more computer instructions. When the computer program instructions are loaded and executed on the computer, the procedures or functions according to the embodiments of the present invention are all or partially generated. The computer may be a general-purpose computer, a dedicated computer, a computer network, or another programmable apparatus. The computer instructions may be stored in a computer readable storage medium or may be transmitted from one computer readable storage medium to another computer readable storage medium. For example, the computer instructions may be transmitted from a website, computer, server, or data center to another website, computer, server, or data center in a wired (for example, by using a coaxial cable, an optical fiber, or a digital subscriber line (DSL)) or wireless (for example, infrared, radio, microwave, or the like) manner. The computer readable storage medium may be any available medium accessible by a computer, or a data storage device, such as a server or a data center, integrating one or more available media. The available medium may be a magnetic medium (such as a floppy disk, a hard disk, or a magnetic tape), an optical medium (such as a DVD), or a semiconductor medium (such as a solid state disk (SSD)), or the like.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this application.

What is claimed is:

1. A method for rate matching in a communications apparatus applying low-density parity-check (LDPC), the method comprising:

performing, by the communications apparatus, rate matching on $C_t$ code blocks to obtain $C_t$ rate matching output sequences, wherein a length E of each rate matching output sequence is based on $C_t$ and the length E satisfies either $E = N_L \cdot Q_m \cdot \lfloor G'/C_t \rfloor$ or $E = N_L \cdot Q_m \cdot \lceil G'/C_t \rceil$, depending on a value j corresponding to a code block number, wherein $G' = G/(N_L \cdot Q_m)$, $Q_m$ is a modulation order, $N_L$ is a quantity of data flows, G is a quantity of available bits used for transmitting a transport block, wherein $C_t$ is a positive integer, and the $C_t$ code blocks correspond to a retransmission sequence of the transport block and comprise M code block groups, and wherein M is a positive integer and M is less than a quantity of code block groups obtained after the transport block is segmented; and outputting, by the communications apparatus, the $C_t$ rate matching output sequences.

2. The method according to claim 1, wherein the length E of each rate matching output sequence satisfies: when $j \leq C_t - \gamma - 1$, $E = N_L \cdot Q_m \cdot \lfloor G'/C_t \rfloor$, or when $j > C_t - \gamma - 1$, $E = N_L \cdot Q_m \cdot \lceil G'/C_t \rceil$.

3. The method according to claim 1, wherein $N_L = 2$ in a transmit diversity mode, or $N_L$ is equal to a quantity of actually sent data flows.

4. The method according to claim 1, further comprising obtaining, by the communications apparatus, a sequence to be rate matched, wherein the sequence to be rate matched is the retransmission sequence.

5. The method according to claim 1, further comprising: the communications apparatus performing segmenting on the transport block.

6. The method according to claim 1, wherein before performing rate matching on the c code blocks, the method further comprises:
  obtaining, by the communications apparatus, a soft buffer size $B_j$ corresponding to the $j^{th}$ code block in the M code block groups, wherein a value of $B_j$ is determined based on $C_t$, a length $K_w$ of the $j^{th}$ code block after being encoded and a soft buffer size $N_{IR}$ of the transport block, wherein $K_w$ and $N_{IR}$ are positive integers; and
  determining, by the communications apparatus and based on $B_j$, a bit set used for transmission, wherein the $C_t$ output sequences are obtained based on the bit set.

7. The method according to claim 6, wherein the value of $B_j$ satisfies $B_j = \min(\lfloor N_{IR}/C_t \rfloor, K_w)$.

8. The method according to claim 6, wherein the value of $B_j$ satisfies $B_j = \min(\lfloor N_{IR}/C_t \rfloor, K_w, N_{max})$, wherein $N_{max}$ represents a maximum available length of an encoded code block.

9. A communications apparatus applying low-density parity-check (LDPC), the communications apparatus comprising:
  a processor configured to perform rate matching on $C_t$ code blocks to obtain $C_t$ rate matching output sequences,
    wherein a length E of each rate matching output sequence is based on $C_t$,
    wherein $C_t$ is a positive integer, and the $C_t$ code blocks correspond to a retransmission sequence of a transport block and comprise M code block groups,
    wherein M is a positive integer and M is less than a quantity of code block groups obtained after the transport block is segmented, wherein the length E satisfies either $E = N_L \cdot Q_m \cdot \lfloor G'/C_t \rfloor$ or $E = N_L \cdot Q_m \cdot \lceil G'/C_t \rceil$, depending on a value j corresponding to a code block number,
    wherein $G' = G/(N_L \cdot Q_m)$, $\gamma = G' \bmod C_t$, $Q_m$ is a modulation order, $N_L$ is a quantity of data flows, G is a quantity of available bits used for transmitting the transport block, J corresponds to a code block number; and
  interface circuitry configured to output the $C_t$ rate matching output sequences.

10. The communications apparatus according to claim 9, wherein the length E of each rate matching output sequence satisfies: when $j \leq C_t - \gamma - 1$, $E = N_L \cdot Q_m \cdot \lfloor G'/C_t \rfloor$, or when $j > C_t - \gamma - 1$, $E = N_L \cdot Q_m \cdot \lceil G'/C_t \rceil$.

11. The communications apparatus according to claim 9, wherein $N_L = 2$ in a transmit diversity mode, or $N_L$ is equal to a quantity of actually sent data flows.

12. The communications apparatus according to claim 9, further comprising a memory configured to store a sequence to be rate matched, wherein the sequence to be rate matched is the retransmission sequence.

13. The communications apparatus according to claim 9, wherein the apparatus is a terminal or a base station or a chip.

14. The communications apparatus according to claim 9, the processor is further configured to perform segmenting on the transport block.

15. The communications apparatus according to claim 9, wherein the processor is further configured to:
  obtain a soft buffer size $B_j$ corresponding to the $j^{th}$ code block in the M code block groups, wherein a value of $B_j$ is determined based on $C_t$, a length $K_w$ of the $j^{th}$ code block after being encoded and a soft buffer size $N_{IR}$ of the transport block, wherein $K_w$ and $N_{IR}$ are positive integers; and
  determine, based on $B_j$, a bit set used for transmission, wherein the $C_t$ output sequences are obtained based on the bit set.

16. The communications apparatus according to claim 15, wherein the value of $B_j$ satisfies $B_j = \min(\lfloor N_{IR}/C_t \rfloor, K_w)$.

17. The communications apparatus according to claim 15, wherein the value of $B_j$ satisfies $B_j = \min(\lfloor N_{IR}/C_t \rfloor, K_w, N_{max})$, wherein $N_{max}$ represents a maximum available length of an encoded code block.

18. A communications apparatus applying low-density parity-check (LDPC), the communications apparatus comprising:
  a processor; and
  a memory coupled to the processor and configured to store computer readable programs which, when executed by the processor, cause the communications apparatus to perform:
  performing rate matching on $C_t$ code blocks to obtain $C_t$ rate matching output sequences,
    wherein a length E of each rate matching output sequence is based on $C_t$,
    wherein $C_t$ is a positive integer, and the $C_t$ code blocks correspond to a retransmission sequence of a transport block and comprise M code block groups,
    wherein M is a positive integer and M is less than a quantity of code block groups obtained after the transport block is segmented,
    wherein the length E satisfies either $E = N_L \cdot Q_m \cdot \lfloor G'/C_t \rfloor$ or $E = N_L \cdot Q_m \cdot \lceil G'/C_t \rceil$, depending on a value j corresponding to a code block number, wherein $G' = G/(N_L \cdot Q_m)$, $\gamma = G' \bmod C_t$, $Q_m$ is a modulation order, $N_L$ is a quantity of data flows, G is a quantity of available bits used for transmitting the transport block, j corresponds to a code block number;
  outputting the $C_t$ rate matching output sequences.

19. The apparatus according to claim 18, wherein the length E of each rate matching output sequence satisfies: when $j \leq C_t - \gamma - 1$, $E = N_L \cdot Q_m \cdot \lfloor G'/C_t \rfloor$, or when $j > C_t - \gamma - 1$, $E = N_L \cdot Q_m \cdot \lceil G'/C_t \rceil$.

20. The apparatus according to claim 18, wherein $N_L = 2$ in a transmit diversity mode, or $N_L$ is equal to a quantity of actually sent data flows.

21. A non-transitory, computer readable medium storing one or more instructions that, when executed by a processor in a communications apparatus applying low-density parity-check (LDPC), cause the processor to provide the following operations:
  performing rate matching on $C_t$ code blocks to obtain $C_t$ rate matching output sequences,
    wherein a length E of each rate matching output sequence is based on $C_t$ and the length E satisfies either $E=N_L \cdot Q_m \cdot \lfloor G'/C_t \rfloor$ or $E=N_L \cdot Q_m \cdot \lceil G'/C_t \rceil$, depending on a value j of a code block number, wherein $G'=G/(N_L \cdot Q_m)$, $Q_m$ is a modulation order, $N_L$ is a quantity of data flows, G is a quantity of available bits used for transmitting the transport block, wherein $C_t$ is a positive integer, and the $C_t$ code blocks correspond to a retransmission sequence of a transport block and comprise M code block groups, and wherein M is a positive integer and M is less than a quantity of code block groups obtained after the transport block is segmented, outputting the $C_t$ rate matching output sequences.

* * * * *